US011579928B2

(12) United States Patent
Cheng et al.

(10) Patent No.: US 11,579,928 B2
(45) Date of Patent: Feb. 14, 2023

(54) SYSTEMS AND METHODS FOR CONFIGURING A WATERMARK UNIT WITH WATERMARK ALGORITHMS FOR A DATA PROCESSING ACCELERATOR

(71) Applicant: Baidu USA LLC, Sunnyvale, CA (US)

(72) Inventors: Yueqiang Cheng, Sunnyvale, CA (US); Yong Liu, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

(*) Notice: Subject to any disclaimer, the term of this patent is extended or adjusted under 35 U.S.C. 154(b) by 586 days.

(21) Appl. No.: 16/684,295

(22) Filed: Nov. 14, 2019

(65) Prior Publication Data

US 2021/0149733 A1    May 20, 2021

(51) Int. Cl.
*G06F 9/50* (2006.01)
*G06N 20/00* (2019.01)
*G06F 21/44* (2013.01)
*G06F 21/16* (2013.01)

(52) U.S. Cl.
CPC ............ *G06F 9/5027* (2013.01); *G06F 21/16* (2013.01); *G06F 21/44* (2013.01); *G06N 20/00* (2019.01); *G06F 2221/0733* (2013.01)

(58) Field of Classification Search
CPC ...................................................... G06F 9/5027
See application file for complete search history.

(56) References Cited

U.S. PATENT DOCUMENTS

| | | | |
|---|---|---|---|
| 7,395,433 | B2 | 7/2008 | Chow et al. |
| 2001/0009581 | A1 | 7/2001 | Hashimoto |
| 2010/0098288 | A1 | 4/2010 | Thiebaud et al. |
| 2010/0254537 | A1 | 10/2010 | Buer et al. |
| 2015/0121548 | A1 | 4/2015 | Dulkin et al. |
| 2017/0141994 | A1 | 5/2017 | Li et al. |
| 2019/0205508 | A1 | 7/2019 | Poddar et al. |
| 2020/0019857 | A1 | 1/2020 | Wang et al. |
| 2020/0193274 | A1 | 6/2020 | Darvish Rouhani et al. |
| 2020/0358799 | A1* | 11/2020 | Boyer ................. H04L 67/12 |
| 2021/0019605 | A1 | 1/2021 | Rouhani et al. |
| 2021/0110009 | A1 | 4/2021 | Liu et al. |
| 2021/0390447 | A1* | 12/2021 | Cheruvu ............ H04L 9/0643 |
| 2022/0030324 | A1 | 1/2022 | Stavropoulos |

* cited by examiner

*Primary Examiner* — Simon P Kanaan
(74) *Attorney, Agent, or Firm* — Womble Bond Dickinson (US) LLP

(57) ABSTRACT

Embodiments of the disclosure relate to configuring a watermark unit with watermark algorithms for artificial intelligence (AI) models for a data processing (DP) accelerator. In one embodiment, in response to a request received by a DP accelerator, the request, sent by an application, to apply a watermark algorithm to an AI model by the DP accelerator, a system determines that the watermark algorithm is not available at a watermark unit of the DP accelerator. The system sends a request for the watermark algorithm. The system receives the watermark algorithm by the DP accelerator. The system configures the watermark unit at runtime with the watermark algorithm for the watermark algorithm to be used by the DP accelerator.

21 Claims, 17 Drawing Sheets

SYSTEMS AND METHODS FOR CONFIGURING A WATERMARK UNIT WITH WATERMARK ALGORITHMS FOR A DATA PROCESSING ACCELERATOR

TECHNICAL FIELD

Embodiments of the present disclosure relate generally to machine-learning model training and inference. More particularly, embodiments of the disclosure relate to configuring a watermark unit with watermark algorithms for artificial intelligence (AI) models for a data processing (DP) accelerator.

BACKGROUND

Machine-learning models have been widely utilized recently as artificial intelligence (AI) technology has been deployed in a variety of fields such as image classification or autonomous driving. Similar to an executable image or binary image of a software application, a machine-learning model (also referred to as an artificial intelligence (AI) model), when trained, can perform inference based on a set of features to classify the features. As a result, a machine-learning model can be "portable" and utilized without authorization. Currently there has been a lack of effective digital rights protection for machine-learning models. In addition, a processing task using an AI model delegated to a secondary processing system, such as a processing (DP) accelerator or remote system, there has been lack of proof that the results produced by the DP accelerator system are protected by a "root of trust" system.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
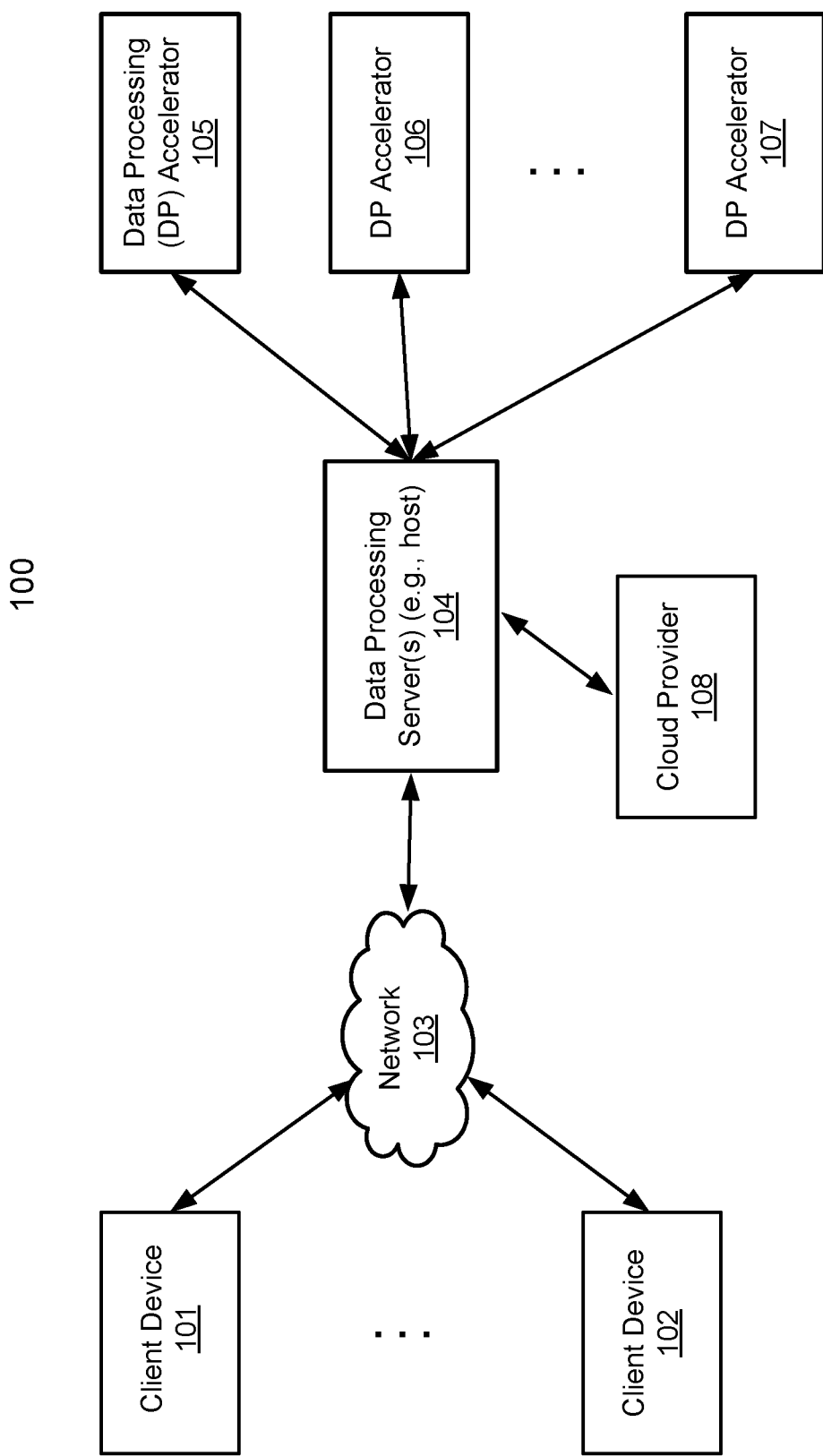
FIG. 1 is a block diagram illustrating an example of a system configuration for communication between a host and data process (DP) accelerators according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of a data processing (DP) accelerator to increase processing throughput of certain types of operations that may be offloaded (or delegated) from a host device to the DP accelerator. A DP accelerator can be a graphics processing unit (GPU), an artificial intelligence (AI) accelerator, math coprocessor, digital signal processor (DSP), or other type of processor. A DP accelerator can be a proprietary design, such as a Baidu® AI accelerator, an NVIDIA® GPU, and the like. While embodiments are illustrated and described with host device securely coupled to one or more DP accelerators, the concepts described herein can be implemented more generally as a distributed processing system.

The host device and the DP accelerator can be interconnected via a high-speed bus, such as a peripheral component interconnect express (PCIe), or other high-speed bus. The host device and DP accelerator can exchange keys and initiate a secure channel over the PCIe bus before performing operations of the aspects of the invention described below. Some of the operations include the DP accelerator using an artificial intelligence (AI) model (or a machine-learning model) to perform inferences using data provided by the host device. Before the AI model inferences are trusted by the host device, the host device can engage the DP accelerator to perform one or more verifications, described below, including determining a watermark of the AI model. In some embodiments and operations, the DP accelerator is not aware that the host device is verifying a watermark of the AI model at the DP accelerator.

A watermark of an AI model is an identifier embedded within the AI model, or in outputs of the AI model, or a combination thereof, that identifies the source/maker of the AI model. Embed or implant refers to modifying an AI model or a training of an AI model, such as modifying a layer, or a weight of the AI model, or a training epoch (or other training parameters) for the AI model. In some embodiments, the watermark can be a subset of weights within the AI model that, when extracted from the AI model, comprise the watermark. In an embodiment, the host device can send a particular input to the DP accelerator that, when the DP accelerator executes the AI model using the particular input, extracts the watermark from the AI model. The host device can validate/verify the watermark for authorization before using the DP accelerator and/or AI model.

According to a first aspect, in response to a request received by the data processing accelerator, the request sent by an application (the application can be hosted by a host machine) to embed digital rights protection to an artificial intelligence (AI) model, a system (e.g., a DP accelerator) generates a watermark for the AI model based on a watermark algorithm. The system embeds the watermark onto the AI model. The system signs the AI model having the embedded watermark to generate a signature. The system returns the signature and the AI model having the embedded watermark back to the application, where the signature is used to authenticate the watermark and/or the AI model.

In one embodiment, a system (e.g., host) sends a request by an artificial intelligence (AI) application to a data processing accelerator, the request to generate a watermark for an AI model based on a watermark algorithm, embed the watermark onto the AI model, and generate a signature for the AI model with the watermark based on a security key pair. The system receives the signature, wherein the signature is used to authenticate the watermark and/or the AI model.

According to a second aspect, in response to a request received by a data processing (DP) accelerator, the request, sent by an application, to apply a watermark algorithm to an artificial intelligence (AI) model by the DP accelerator, a system (e.g., a DP accelerator) determines that the watermark algorithm is not available at a watermark unit of the DP accelerator. The system sends a request for the watermark algorithm. The system receives the watermark algorithm by the DP accelerator. The system configures the watermark unit at runtime with the watermark algorithm for the watermark algorithm to be used by the DP accelerator.

According to a third aspect, a system (e.g., a DP accelerator) trains a watermark algorithm based on a predetermined set of criteria, where the watermark algorithm is trained to generate variations of the watermark algorithm. The system configures the watermark unit at runtime with a variation of the watermark algorithm for the watermark algorithm to be used by the DP accelerator.

According to a fourth aspect, a system (e.g., a DP accelerator) receives an inference request from an application. The system extracts the watermark from an artificial intelligence (AI) model having the watermark. The system verifies the extracted watermark based on a policy. The system applies the AI model having a watermark to a set of inference inputs to generate inference results. The system sends a verification proof and the inference results to the application.

In one embodiment, a system (e.g., a host application) sends an inference request to a data processing (DP) accelerator, the request to generate inference results by applying an artificial intelligence (AI) model with a watermark to inference inputs, where the request includes extracting the watermark from the AI model having the watermark by the DP accelerator, and verifying the extracted watermark based on a policy. The system receives a verification proof and the inference results to the application.

Any of the above functionality can be programmed as executable instructions onto one or more non-transitory computer-readable media. When the executable instructions are executed by a processing system having at least one hardware processor, the processing systems causes the functionality to be implemented.

Any of the above functionality can be implemented by a processing system having at least one hardware processor, coupled to a memory programmed with executable instructions that, when executed, cause the processing system to implement the functionality.

With respect to any of the above aspects, in one embodiment, a watermark may be embedded in one or more nodes of one or more layers of an AI or machine-learning model. For example, a watermark may be implanted in one or more weight variables or bias variables. Alternatively, one or more nodes (e.g., fake nodes that are not used or unlikely used by the machine-learning model) or layer of nodes may be created to implant or store the watermark. A host processor may be a central processing unit (CPU) and a DP accelerator may be a general-purpose processing unit (GPU) coupled to the CPU over a bus or interconnect. A DP accelerator may be implemented in a form of an application-specific integrated circuit (ASIC), a field programmable gate array (FPGA) device, or other forms of integrated circuits (ICs). Alternatively, the host processor may be a part of a primary data processing system while a DP accelerator may be one of many distributed systems as secondary systems that the primary system can offload its data processing tasks remotely over a link or a network (e.g., cloud computing systems such as a software as a service or SaaS system, or a platform as a service or Paas system). A link between a host processor and a DP accelerator may be a peripheral component interconnect express (PCIe) link or a network connection such as Ethernet connection.

FIG. 1 is a block diagram illustrating an example of a system configuration for communication between a host and data process (DP) accelerators according to one embodiment. Referring to FIG. 1, system configuration 100 includes, but is not limited to, one or more client devices 101-102 communicatively coupled to data processing server 104 via network 103. Data processing server 104 can be coupled to cloud provider 108 via network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless. The communication between client devices 101-102, data processing server 104, and cloud provider 108 over network 103 can be secured, e.g., via TLS/SSL.

Data processing server (e.g., host) 104 may be any kind of servers or a cluster of servers, such as Web or cloud servers, application servers, backend servers, or a combination thereof. Server 104 can include an interface to allow a client such as client devices 101-102 to access resources or services provided by server 104. For example, server 104 may be a cloud server or a server of a data center that provides a variety of cloud services to clients, such as, for example, cloud storage, cloud computing services, big data services, modeling services, machine-learning training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., artificial intelligence (AI) training, inference instruction, etc.) for execution to server 104 and the instruction is received by server 104 via the interface over network 103. In response to the instruction, server 104 communicates with DP accelerators 105-107 to fulfill the execution of the instruction. In another embodiment a client may run remotely an application from server 104 (via a web browser or a web application) and the client can remotely request the application to perform the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu® artificial intelligence (AI) chipset available from Baidu® or alternatively, the DP accelerator may be an AI chipset from NVIDIA®, an Intel®, or some other AI chipset providers.

According to one embodiment, each of the applications accessing any of DP accelerators 105-107 and hosted by DP server 104, also referred to as a host, may be verified that the application is provided by a trusted source or vendor. Each of the applications may be launched and executed within a trusted execution environment (TEE) specifically configured and executed by a central processing unit (CPU) of host 104. When an application is configured to access any one of the DP accelerators 105-107, a secure connection will be established between host 104 and the corresponding one of the DP accelerator 105-107, such that the data exchanged between host 104 and each of DP accelerators 105-107 is protected against the attacks from malwares.

Cloud provider 108 can provide cloud operation services to data processing server 104. Such services include management, provisioning and configuration of a cloud network which server 104 may be a part of. Although shown as a single server, in some embodiments, cloud provider 108 may represent many servers, or may be an integrated with data processing server 104.

Figure 2:
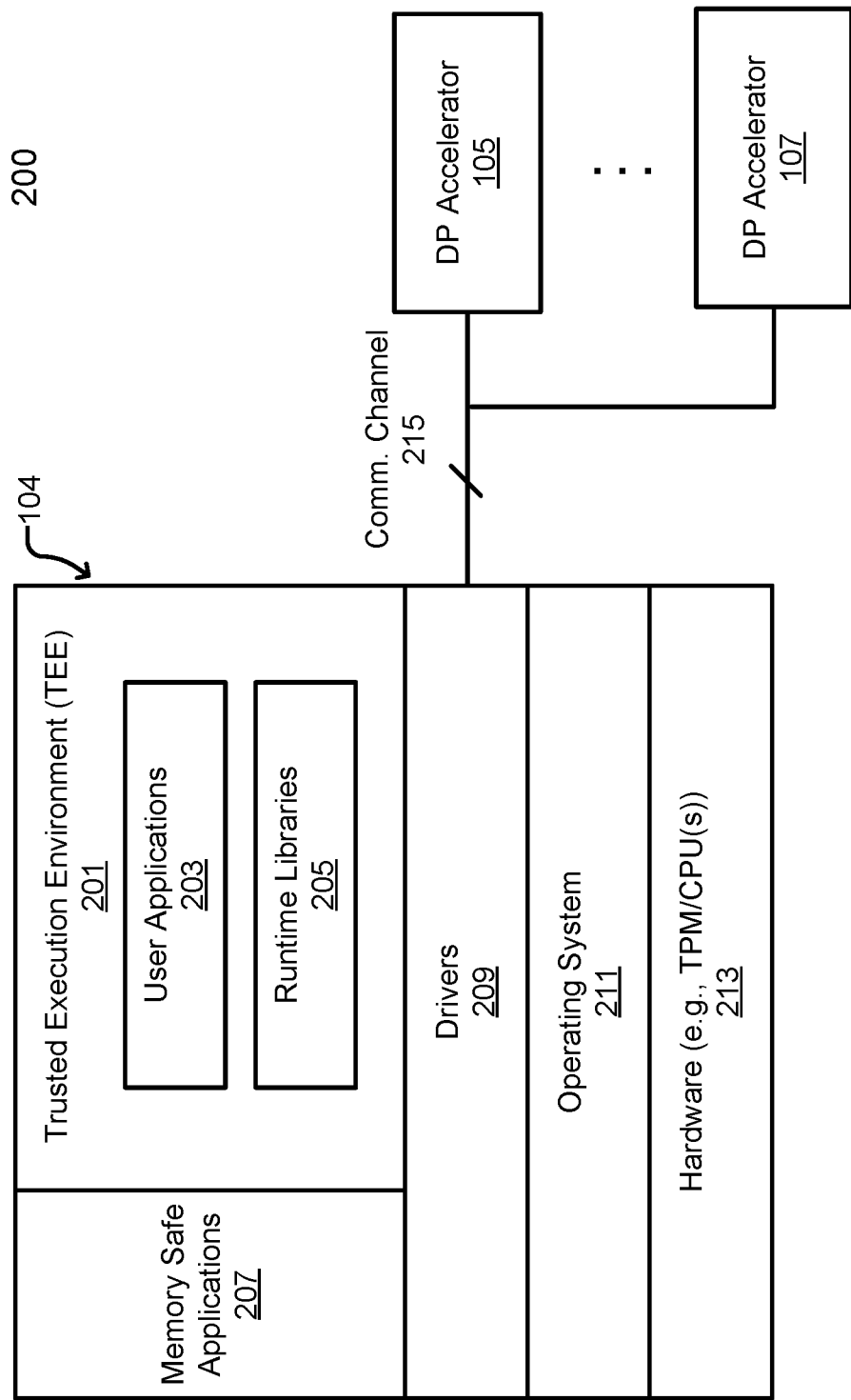
FIG. 2 is a block diagram illustrating an example of a host server in communication with data processing (DP) accelerators according to one embodiment.

FIG. 2 is a block diagram illustrating an example of a host in communication with data processing (DP) accelerators according to one embodiment. In one embodiment, system 200 provides a protection scheme for secure communications between host and DP accelerators with or without hardware modifications to the DP accelerators. Referring to FIG. 2, host machine or server 104 can be depicted as a system with one or more layers to be protected from intrusion such as user application 203, runtime libraries 205, driver 209, operating system 211, and hardware 213 (e.g., security module (trusted platform module (TPM))/central processing unit (CPU)). Host machine 104 is typically a CPU system which can control and manage execution jobs on the host system or DP accelerators 105-107. In order to secure a communication channel between the DP accelerators and the host machine, different components may be required to protect different layers of the host system that are prone to data intrusions or attacks. For example, a trusted execution environment (TEE) can protect the user application layer and the runtime library layer from data intrusions.

Referring to FIG. 2, in one embodiment, host system 104 is to include a hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot.

The TPM chip also secures drivers 209 and operating system (OS) 211 in a working kernel space to communicate with the DP accelerators. Here, drivers 209 are provided by a DP accelerator vendor and can serve as one or more drivers for the user application to control a communication channel between host and DP accelerators. Because TPM chip and secure boot protects the OS and drivers in their kernel space, TPM also effectively protects the drivers 209 and operating system 211.

Since the communication channels for DP accelerators 105-107 may be exclusively occupied by the OS and drivers, thus, the communication channels are also secured through the TPM chip.

In one embodiment, host machine 104 includes trusted execution environment (TEE) 201 which is enforced to be secure by TPM/CPU 213. A TEE is a secure environment. TEE can guarantee code and data which are loaded inside the TEE to be protected with respect to confidentiality and integrity. Examples of a TEE may be Intel software guard extensions (SGX), or AMD secure encrypted virtualization (SEV). Intel SGX and/or AMD SEV can include a set of central processing unit (CPU) instruction codes that allows user-level code to allocate private regions of memory of a CPU that are protected from processes running at higher privilege levels. Here, TEE 201 can protect user applications 203 and runtime libraries 205, where user application 203 and runtime libraries 205 may be provided by end users and DP accelerator vendors, respectively. Here, runtime libraries 205 can convert API calls to commands for execution, configuration, and/or control of the DP accelerators. In one embodiment, runtime libraries 205 provides a predetermined set of (e.g., predefined) kernels for execution by the user applications.

In another embodiment, host machine 104 includes memory safe applications 207 which are implemented using memory safe languages such as Rust, and GoLang, etc. These memory safe applications running on memory safe Linux releases, such as MesaLock Linux, can further protect system 200 from data confidentiality and integrity attacks. However, the operating systems may be any Linux distributions, UNIX, Windows OS, or Mac OS.

In one embodiment, the system can be set up as follows: A memory-safe Linux distribution is installed onto a system (such as host system 104 of FIG. 2) equipped with TPM secure boot. The installation can be performed offline during a manufacturing or preparation stage. The installation can also ensure that applications of a user space of the host system are programmed using memory-safe programming languages. Ensuring other applications running on host system 104 to be memory-safe applications can further mitigate potential confidentiality and integrity attacks on host system 104.

After installation, the system can then boot up through a TPM-based secure boot. The TPM secure boot ensures only a signed/certified operating system and accelerator driver are launched in a kernel space that provides the accelerator services. In one embodiment, the operating system can be loaded through a hypervisor. Note, a hypervisor or a virtual machine manager is a computer software, firmware, or hardware that creates and runs virtual machines. Note, a kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, runtime libraries 205 runs and creates TEE 201, which places runtime libraries 205 in a trusted memory space associated with CPU 213. Next, user application 203 is launched in TEE 201. In one embodiment, user application 203 and runtime libraries 205 are statically linked and launched together. In another embodiment, runtime 205 is launched in TEE first and then user application 205 is dynamically loaded in TEE 201. In another embodiment, user application 205 is launched in TEE first, and then runtime 205 is dynamically loaded in TEE 201. Note, statically linked libraries are libraries linked to an application at compile time. Dynamic loading can be performed by a dynamic linker. Dynamic linker loads and links shared libraries for running user applications at runtime. Here, user applications 203 and runtime libraries 205 within TEE 201 are visible to each other at runtime, e.g., all process data are visible to each other. However, external access to the TEE is denied.

In another embodiment, the user application can only call a kernel from a set of kernels as predetermined by runtime libraries 205. In another embodiment, user application 203 and runtime libraries 205 are hardened with side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In summary, system 200 provides multiple layers of protection for DP accelerators (such as communications of data such as machine learning models, training data, and inference outputs) from loss of data confidential and integrity. System 200 can include a TPM-based secure boot protection layer, a TEE protection layer, and a kernel validation/verification layer. Furthermore, system 200 can provide a memory safe user space by ensuring other applications on the host machine are implemented with memory-safe programming languages, which can further eliminate attacks by eliminating potential memory corruptions/vulnerabilities. Moreover, system 200 can include applications that use side-channel free algorithms so to defend against side channel attacks, such as cache based side channel attacks.

Figure 3:
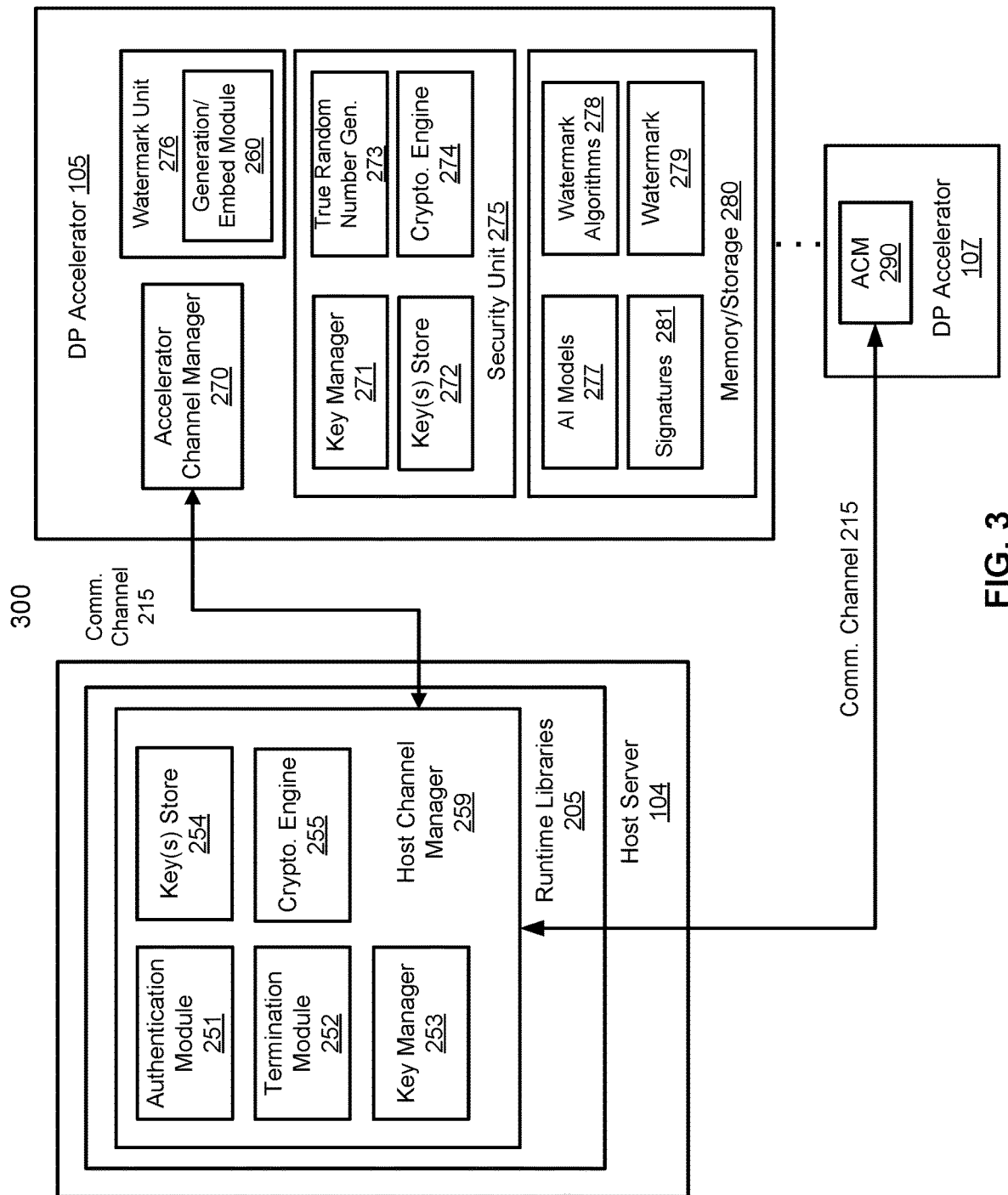
FIG. 3 is a block diagram illustrating a host in communication with data processing accelerators according to one embodiment.

FIG. 3 is a block diagram illustrating a host in communication with data processing accelerators according to one embodiment. System 300 may be a detailed view for portions of system 200 of FIG. 2. Referring to FIG. 3, in one embodiment, host system 104 includes runtime libraries 205 which includes host channel manager (HCM) 259. In one embodiment, HCM 259 includes authentication module 251, termination module 252, key manager 253, key(s) store 254, and cryptography engine 255. Authentication module 251 can authenticate a user application running on host server 104 for permission to access or use a resource of a DP accelerator. Termination module 252 can terminate a connection (e.g., channels associated with the connection would be terminated). Key manager 253 can manage (e.g., create or destroy) asymmetric key pairs or symmetric keys for encryption/decryption of one or more data packets for different secure data exchange channels. Here, each user application (as part of user applications 203 of FIG. 2) can correspond or map to different secure data exchange channels, on a one-to-many relationship, and each data exchange channel can correspond to a DP accelerator. Key(s) store 254 can store encryption asymmetric key pairs or symmetric keys. Cryptography engine 255 can encrypt or decrypt a data packet for the data exchanged through any of the secure channels.

Referring to FIG. 3, in one embodiment, DP accelerator 105 includes ACM 270 (similarly DP accelerator 107 includes 290) and security unit (SU) 275. Security unit 275 can include key manager 271, key(s) store 272, true random number generator 273, and cryptography engine 274. Key manager 271 can manage (e.g., generate, safe keep, and/or destroy) asymmetric key pairs or symmetric keys. Key(s) store 272 can store the cryptography asymmetric key pairs or symmetric keys. True random number generator 273 can generate true random numbers for cryptography. Cryptography engine 274 can encrypt or decrypt key information or data packets for data exchanges. Security unit 275 can contain one or more RSA key pairs (e.g., public and private key pairs) called endorsement keys (EK) or endorsement credentials (EC), i.e., root keys. The key pairs are maintained inside security unit 275 and cannot be accessed by software. Security unit can then encrypt data or generate other security keys (which in turn can be used to encrypt the data) using the EK or EC. Essentially the root credentials (EK/EC) is hardened onto security unit 275 for cryptography purposes. In some embodiments, ACM 270 and SU 275 is an integrated module.

In one embodiment, DP accelerator 105 includes watermark unit 276. Watermark unit 276 can be a hardware-based module that can identify or extract a watermark from an artificial intelligence (AI) model (also termed, "machine-learning model"). In an embodiment, watermark unit 276 includes generation/embed module 260. Generation/embed module 260 can generate a watermark, and embed/implant a watermark onto an artificial intelligence (AI) model. In an embodiment, a watermark can be implanted into the AI model before, after, or during training of the AI model. Watermark unit 276 can also implant (or embed) a watermark onto an AI model during an inference for an AI model. In an embodiment, functionality of the watermark unit 276 can alternatively be implemented using one or more kernels of code received from host 104.

DP accelerator 105 can include memory/storage 280. Memory/storage 280 is a non-persistent or persistent storage media for storage data. The storage data can include AI models 277, watermark algorithms 278, watermarks 279, signatures 281, or any data used by DP accelerator 105.

Figure 4:
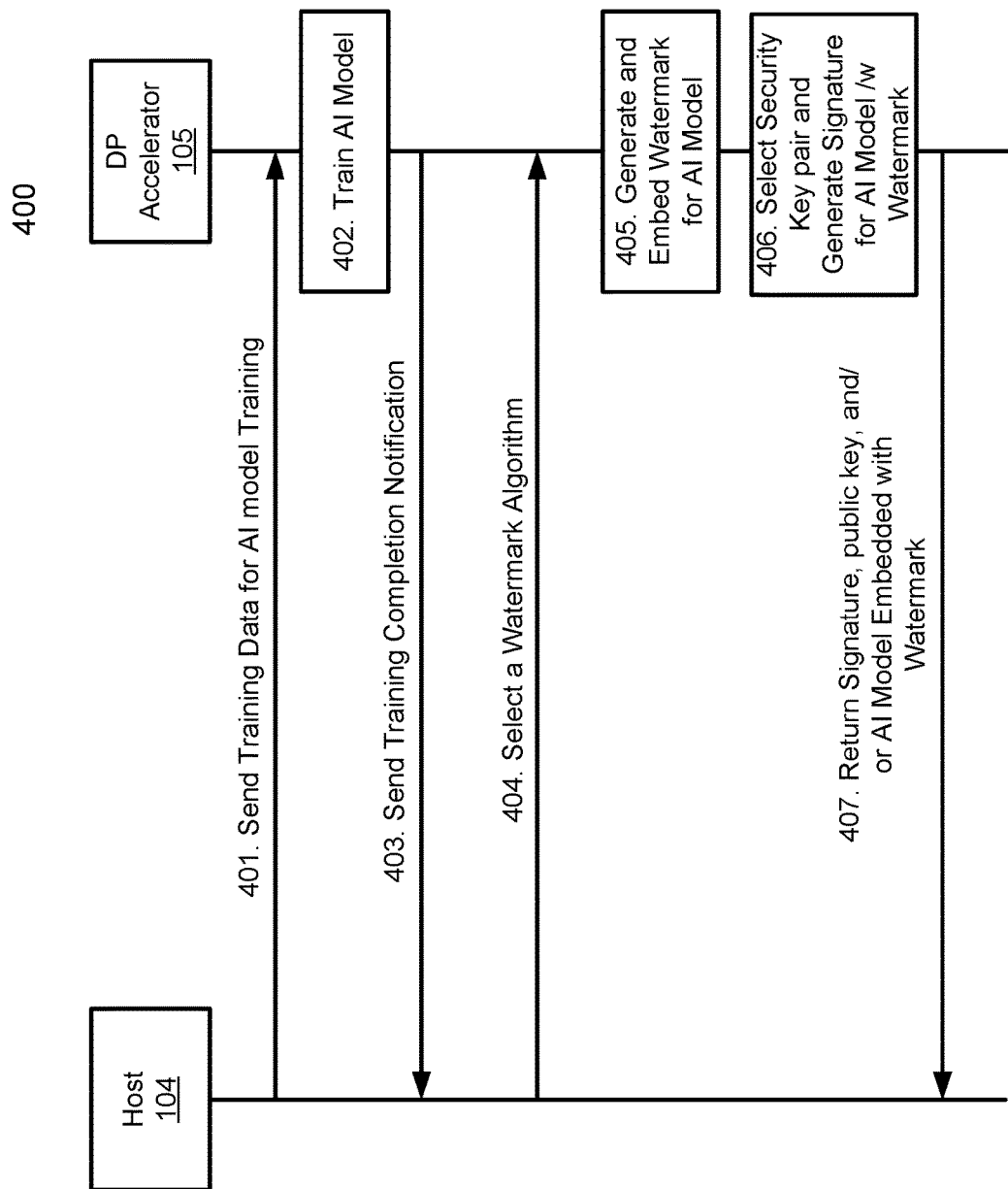
FIG. 4 is a flow chart illustrating a process to sign an AI model embedded with a watermark according to one embodiment.

FIG. 4 is a flow chart illustrating a process to sign an AI model embedded with a watermark according to one embodiment. Operations 400 illustrates embedding of a watermark into an AI model after the AI model is trained. may be performed by a host server 104 and/or a DP accelerator 105 of FIG. 3. Referring to FIG. 4, in operation 401, host server 104 sends a training data set for AI model training to DP accelerator 105 to be processed by the DP accelerator. In operation 402, DP accelerator 105 trains an AI model based on the training data set. In operation 403, upon completion of the training, DP accelerator 105 sends a training completion notification to host 104. In some embodiments, host server 104 may send an AI model to be re-trained based on the training data set. In some embodiments, the training data set among a number of training data set is in a storage/memory of DP accelerator 105 retrievable by DP accelerator 105, where host 104 sends a selection for a training data set instead of the underlying training data set.

In operation 404, host 104 selects a watermark algorithm supported by the AI model. In operation 405, DP accelerator 105 generates and embeds a watermark based on the watermark algorithm onto the AI model. In operation 406, DP accelerator 105 selects a security key pair and generates a signature for the AI model/watermark pair. The security key pair may be generated based on a root credential of the DP accelerator 105. The security key pair can thus be verified as from a trusted source (e.g., DP accelerator 105). In one embodiment, the security key pair includes a public key and a private key, e.g., based on an asymmetric key algorithm such as RSA encryption algorithm. The signing includes generating a hash for the AI model/watermark binary file(s), and encrypting the hash based on the private key of the security key pair to generate the signature. In one embodiment, the hash is a MD5 hash or a variant of a secure hash algorithm (SHA) hash, or any other hash functions. In operation 407, the encrypted hash (e.g., the signature), the public key of the security key pair, and/or the watermark/AI model file(s) are return to host 104, where host 104 or any other third-party can verify the watermark/AI model file(s) using the signature and the public key for a first verification and extract the watermark for a second verification for a two-factor verification.

Although operation 400 describes a watermark embedded into a trained AI model, in some embodiments, the watermark algorithm may be pre-selected as a default selection prior to training, and the watermark algorithm is applied to the AI model before, during, or after training. In another embodiment, the trained AI model is provided by host 104 and the watermarking and signing of the AI model is performed by DP accelerator 105 during an inference. In this embodiment, before DP accelerator 105 applies the watermark and/or generates the signature for the AI model/watermark, DP accelerator 105 attempts to extract a watermark from the AI model/watermark to determine if the AI model already includes a watermark. If the extraction is not successful, then DP accelerator 105 proceeds to apply the watermark and/or to generate the signature for the AI model/watermark. In some embodiments, the AI model/watermark pair includes metadata to indicate a version and/or a type of the watermark algorithm applied to generate the watermark so the watermark can be extracted and/or verified based on the version.

Figure 5:
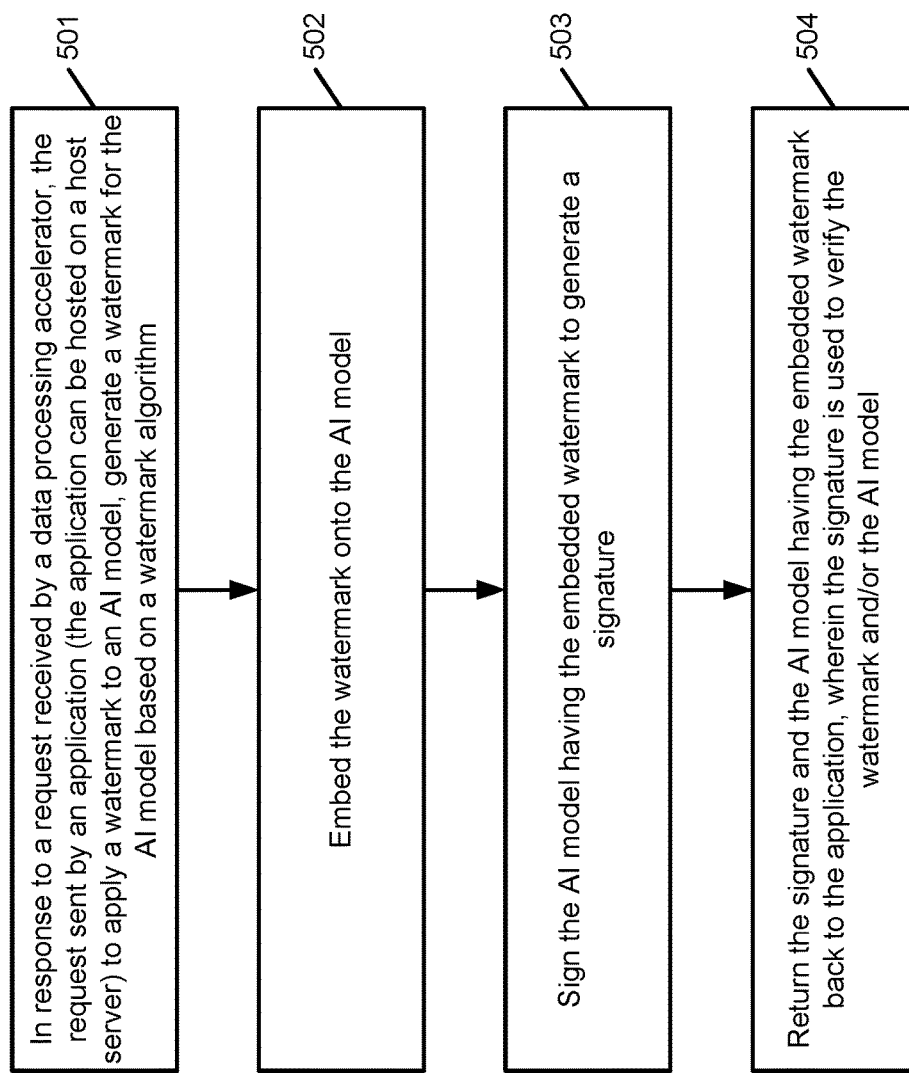
FIG. 5 is a flow diagram illustrating a method performed by a DP accelerator according to one embodiment.

FIG. 5 is a flow diagram illustrating a method performed by a DP accelerator according to one embodiment. Process 500 may be performed by processing logic which may include software, hardware, or a combination thereof. For example, process 500 may be performed by a DP accelerator, such as DP accelerator 105 of FIG. 3. Referring to FIG. 5, at block 501, in response to a request received by a data processing accelerator, the request sent by an application (the application may be hosted by a host 104) to apply a watermark to an artificial intelligence (AI) model, processing logic generates a watermark for the AI model based on a watermark algorithm. At block 502, processing logic embeds the watermark onto the AI model. At block 503, processing logic signs the AI model having the embedded watermark to generate a signature. At block 504, processing logic returns the signature and the AI model having the embedded watermark back to the application, where the signature is used to verify the watermark and/or the AI model.

In one embodiment, processing logic further generates the AI model by training the AI model based on a set of training data. In one embodiment, processing logic further receives a pre-trained AI model and re-trains the AI model by training the AI model based on a set of training data.

In one embodiment, signing the AI model having the embedded watermark includes generating a security key pair by a security unit of the DP accelerator, generating a hash for the AI model having the embedded watermark, and encrypting the hash using a private key of the security key pair to sign the AI model having the embedded watermark. In one embodiment, a public key of the security key pair is used to decrypt the hash to verify the signature for the watermark and/or the AI model.

In another embodiment, processing logic further extracts the watermark from the AI model and verifies the both the extracted watermark and the signature for a two-factor verification. In another embodiment, the security unit includes a root credential hardened onto the security unit, where the security key pair is a plurality of key pairs generated based on the root credential of the security unit and the security key pair is selected by the watermark algorithm to sign the AI model having the embedded watermark.

Figure 6:
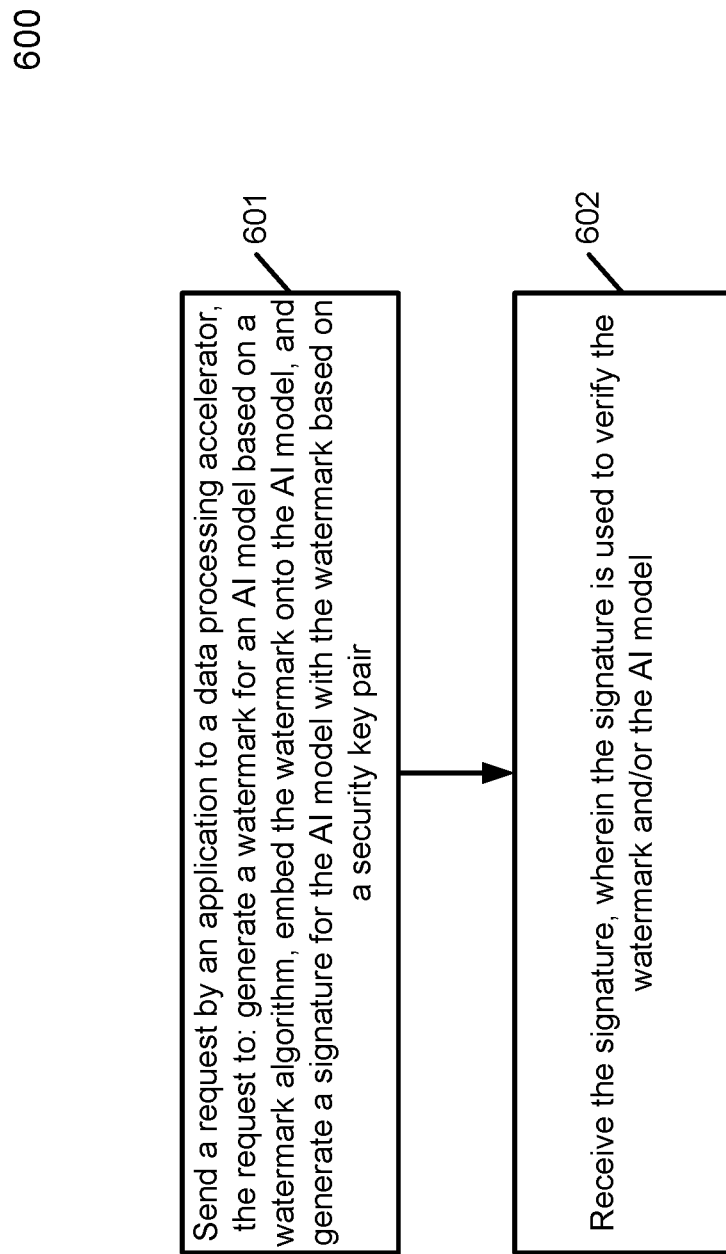
FIG. 6 is a flow diagram illustrating a method performed by an application according to one embodiment.

FIG. 6 is a flow diagram illustrating a method performed by an application according to one embodiment. Process 600 may be performed by processing logic which may include software, hardware, or a combination thereof. For example, process 600 may be performed by a host server, such as host 104 of FIG. 3, or any other third-party (e.g., end-users, customers, etc.). Referring to FIG. 6, at block 601, processing logic sends a request to a data processing accelerator, the request to generate a watermark for an artificial intelligence (AI) model based on a watermark algorithm, embed the watermark onto the AI model, and generate a signature for the AI model with the watermark based on a security key pair. At block 602, processing logic receives the signature and/or the watermark/AI model file(s), where the signature is used to verify the watermark and/or the AI model. For example, processing logic decrypts the signature using a public key of the security key pair to generate a first hash. Processing logic applies a hash algorithm to the watermark/AI model file(s) to generate a second hash. The first and second hash is compared for a match. If matched, the signature is successfully verified.

In one embodiment, processing logic sends a set of training data to the data processing accelerator (e.g., via host 104) to train the AI model based on the set of training data. In another embodiment, processing logic sends a pre-trained AI model to the data processing accelerator, wherein the AI model is retrained based on the set of training data. In one embodiment, the AI model having the embedded watermark is signed by a security unit of the DP accelerator. A security unit can generate a security key pair based on an EK or EC. The security unit can then generate a hash for the AI model having the embedded watermark, and encrypt the hash using a private key of the security key pair to sign the AI model having the embedded watermark. In another embodiment, a public key of the security key pair is used to decrypt the hash to verify the signature for the watermark and/or the AI model.

In another embodiment, the verification includes extracting the watermark from the AI model, and further verifying the extracted watermark for a two-factor verification. In another embodiment, the security unit includes a root credential hardened onto the security unit, where the security key pair is a number of key pairs generated based on the root credential of the security unit and the security key pair is selected by the watermark algorithm to sign the AI model having the embedded watermark.

At runtime, a user via an application of host 104 can select a watermark algorithm to apply to a watermark to an AI model. The selected watermark algorithm can be selected based on a set of algorithms available or unavailable at a particular DP accelerator. If a watermark algorithm is available at the DP accelerator, the DP accelerator can apply the algorithm to the AI model. If a watermark algorithm is not available at the DP accelerator, the DP accelerator can send a request to the application via host 104 for the watermark algorithm. The application can subsequently send the requested watermark algorithm to the DP accelerator. In addition, out-of-date or unused watermark algorithms (after an expiration time threshold) can be automatically scheduled for removal from a storage of the DP accelerator.

Figure 7:
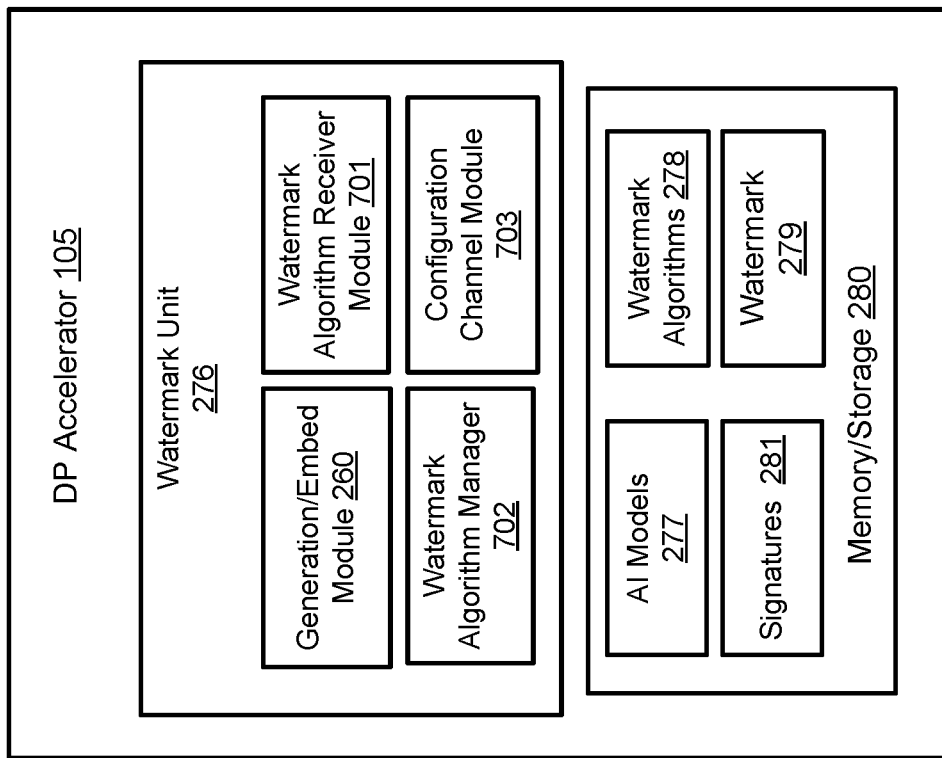
FIG. 7 is a block diagram illustrating a DP accelerator having a configurable watermark unit according to one embodiment.

FIG. 7 is a block diagram illustrating a DP accelerator having a configurable watermark unit according to one embodiment. Referring to FIG. 7, in one embodiment, watermark unit 276 includes generation/embed module 260, watermark algorithm receiver module 701, watermark algorithm manager 702, and configuration channel module 703. Generation/embed module 260 can generate a watermark based on a watermark algorithm and embed the watermark onto an AI model. Watermark algorithm receiver module 701 can receive a watermark algorithm from a third party source, or from the application of host 104. Watermark algorithm manager 702 can manage one or more watermark algorithms for unit 276. Configuration channel module 703 can configure a channel via cloud provider at the virtual machine level for a virtual machine to send a watermark algorithm to unit 276.

As a preliminary matter, a watermark for an AI model is an identifier identifying a source for a AI model. A watermark can include a pattern of redundant or non-redundant weights, nodes, and/or layers of nodes for an AI model. A watermark can also include modification of weights during trained to generate an output that has a watermark identifier with a particular inference input. Examples of a watermark identifier in the output for an AI model that outputs images include images that exhibits a machine and/or human readable identifier (e.g., logo of a company, organization, or team) as the source of the AI model. The types of watermark algorithms include algorithms that add dummy nodes, layers, and/or alter weights, bias, and/or activation functions of an AI model. Other watermark algorithm can alter one or more parameters of a training subroutine or to include a hidden set of training data for training, where the hidden set of training data is not retrievable by a user/operator/trainer of the IA model. Thus, the trained AI model can infer a watermark output based on an input of, or an input derived from, the hidden set of training data.

Figure 8:
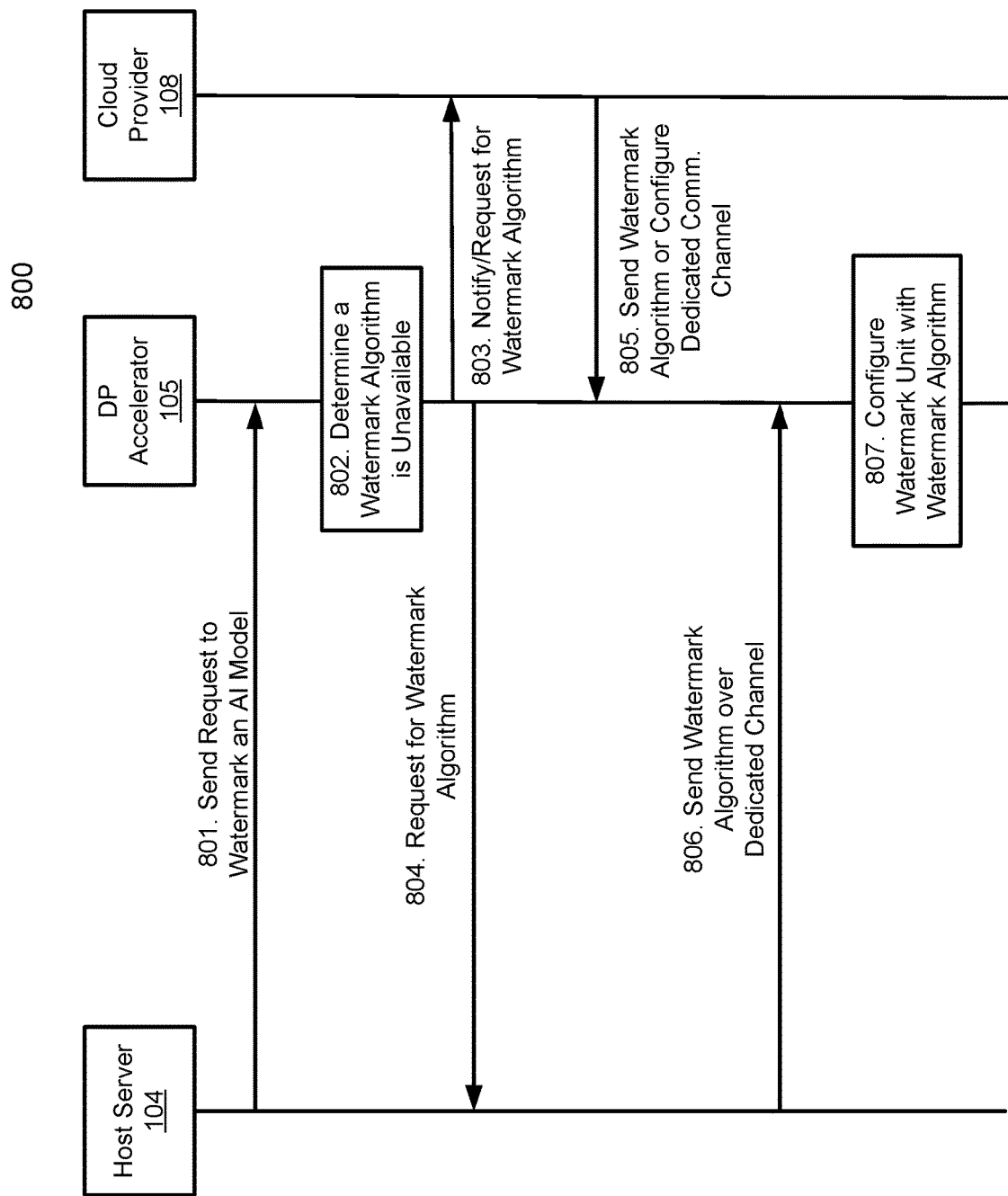
FIG. 8 is a flow chart illustrating a process to configure a watermark unit with a watermark algorithm according to one embodiment.

FIG. 8 is a flow chart illustrating a process to configure a watermark unit with a watermark algorithm according to one embodiment. Process 800 may be performed by processing logic which may include software, hardware, or a combination thereof. For example, process 800 may be performed by a host 104, a DP accelerator 105, or a cloud provider 108 of FIG. 1, or a DP accelerator 105 of FIG. 7. Referring to FIG. 8, at block 801, an application (via host 104) sends a request to DP accelerator 105, the request to apply a particular watermark algorithm to an AI model. At block 802, DP accelerator 105 determines that the particular watermark algorithm is unavailable at DP accelerator 105. At block 803, DP accelerator 105 notifies cloud provider 108 for the cloud provider 108 to apply a configuration setting of the cloud provider 108. In one embodiment, cloud provider 108 is notified to configure a dedicated channel, for DP accelerator 105 to receive the particular watermark algorithm from the application (via host 104). In another embodiment, cloud provider 108 is notified and thus cloud provider 108 can subsequently accept a particular requested changes in configuration settings. In one embodiment, the dedicated channel configuration is at a virtual machine level. At block 804, DP accelerator 105 sends a request to host 104 for the watermark algorithm. at block 805, if cloud provider 108 has the watermark algorithm, cloud provider 108 returns the requested watermark algorithm to DP accelerator 105 or cloud provider 108 configures the dedicated channel. At block 806, host 104 sends the watermark algorithm over the dedicated channel. At block 807, DP accelerator 105 configures watermark unit with the watermark algorithm to make the watermark algorithm available to any requests at DP accelerator 105. In some cases, a watermark algorithm can be configured to expire if the algorithm is not used after a predetermined time threshold. Expired watermark algorithm can be schedule for removal to replace with improved versions of the algorithm or to make storage space available to other algorithms.

Figure 9:
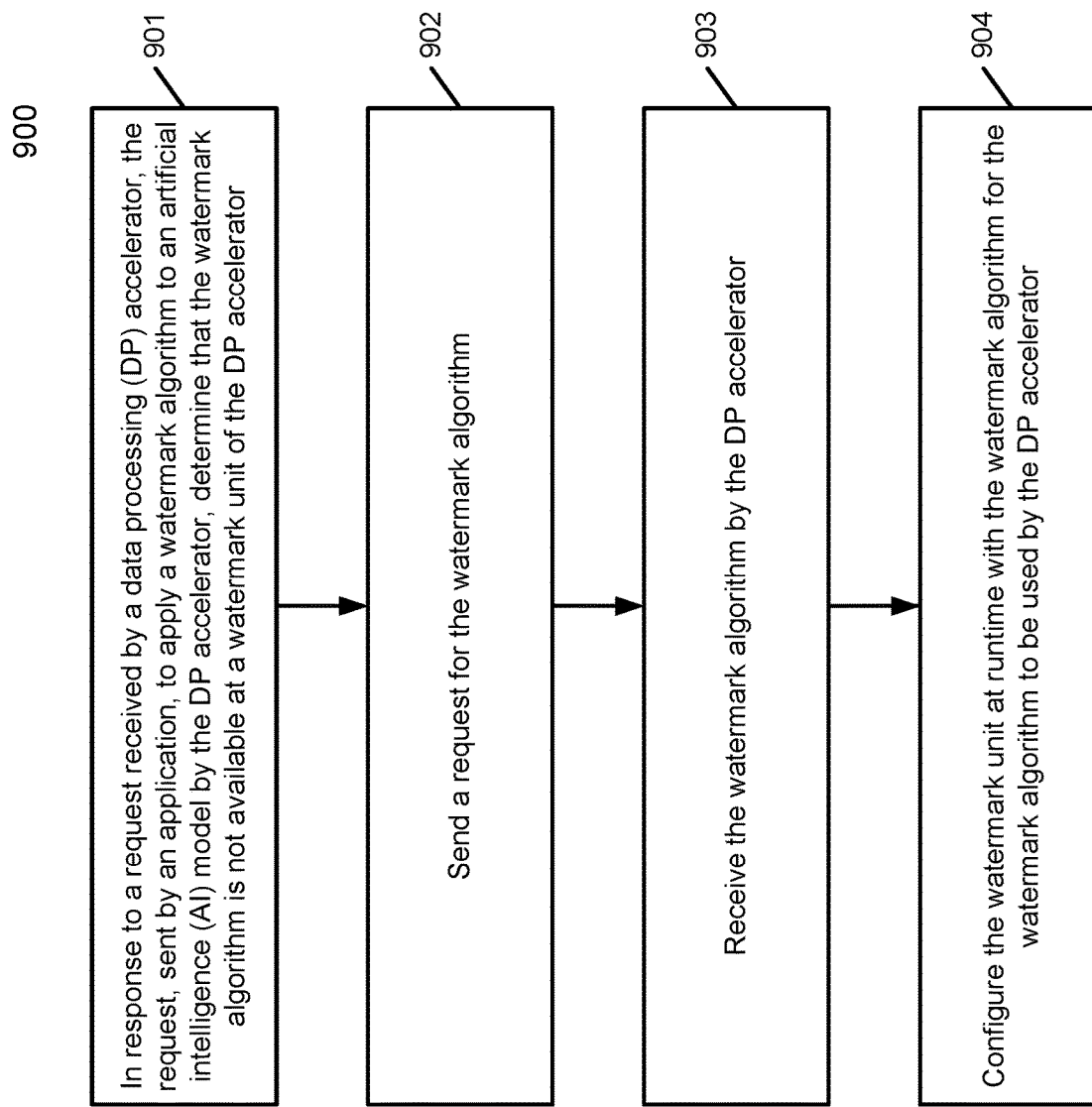
FIG. 9 is a flow diagram illustrating a method performed by a DP accelerator according to one embodiment.

FIG. 9 is a flow diagram illustrating a method performed by a DP accelerator according to one embodiment. Process 900 may be performed by processing logic which may include software, hardware, or a combination thereof. For example, process 900 may be performed by a DP accelerator 105 of FIG. 7. Referring to FIG. 9, at block 901, in response to a request received by a data processing (DP) accelerator, the request, sent by an application (the application can be hosted by host 104) to apply a watermark algorithm to an artificial intelligence (AI) model by the DP accelerator, processing logic determines that the watermark algorithm is not available at a watermark unit of the DP accelerator. At block 902, processing logic sends a request for the watermark algorithm. At block 903, processing logic receives the watermark algorithm by the DP accelerator. At block 904, processing logic configures the watermark unit at runtime with the watermark algorithm for the watermark algorithm to be used by the DP accelerator.

In one embodiment, processing logic further embeds a watermark based on the watermark algorithm into the AI model. Processing logic returns the AI model having the embedded watermark back to the application, wherein the watermark is used to authenticate the AI model. In another embodiment, processing logic further signs the AI model with the watermark to generate a signature, wherein the signature is used to authenticate the AI with the watermark for a two-factor authentication.

In one embodiment, the watermark algorithm is provided by a cloud provider, or a user of the cloud provider, or an application on a user device, or an application hosted by the host machine of the cloud provided by the cloud provider. In one embodiment, the watermark algorithm is received via a dedicated communication channel, wherein the communication channel is configured by the cloud provider.

In one embodiment, processing logic further generates the AI model by training the AI model based on a set of training data receiving from the application via the host. In one embodiment, processing logic further receives a pre-trained AI model, and retrains the AI model by training the AI model based on a set of training data.

In the foregoing paragraphs, some types of watermark algorithms were discussed, including a "type 1" of watermark algorithms that add dummy layers and/or alter weights of an AI model and a "type 2" of watermark algorithms that alter a training subroutine to include a hidden set of training data for training, where the hidden set of training data is not retrievable by a user/operator/trainer of the IA model. The follow is pseudocode for these watermark algorithms.

Pseudocode for the type 1: (input: AI model; output: watermarked AI model)
add dummy layers after some selective original layers, and for each layer:
    add dummy weights at a particular location, and/or
    edit weights.

Pseudocode for the type 2: (input: training subroutine and/or training input data; output: modified training subroutine and/or training input data) Insert hidden training input data or adjust training variables for the training subroutine or training input data.

A verification process to verify the type 1 can check the weights and/or layers for a particular signature as verification for the watermark, e.g., weights at particular locations or layers have a particular pattern of trailing decimal values by the addition or subtraction of some peppercorn values such as 0.000001221 or 0.0000001221. The verification process to verify the type 2 can perform an inference using an input data that infers the output data having a machine-readable watermark. The verification process then checks the output data if the watermark is present for verification. Because the watermark algorithms and the verification process can influence inference accuracy or how well the watermark is embedded to an AI model, the watermark algorithm can evolve/adapt to new AI models.

Figure 10:
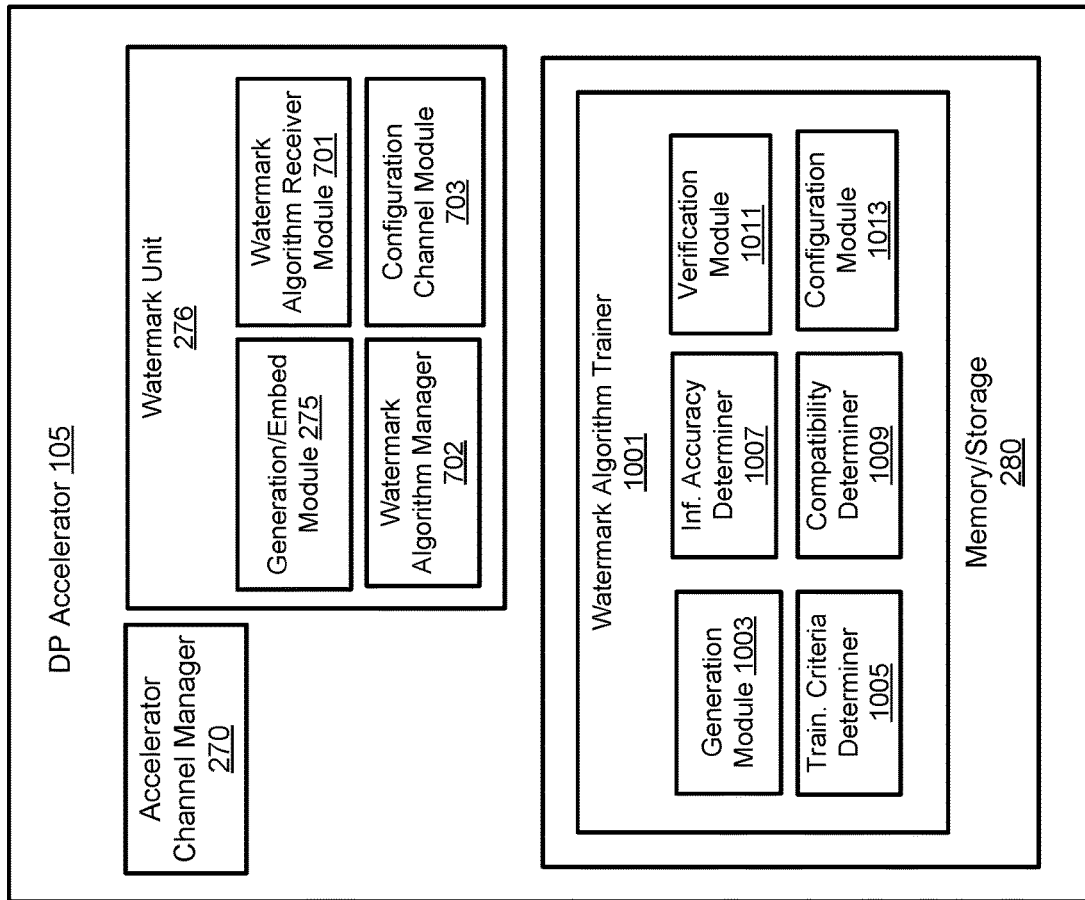
FIG. 10 is a block diagram illustrating a DP accelerator with a watermark algorithm trainer according to one embodiment.

FIG. 10 is a block diagram illustrating a DP accelerator with a watermark algorithm trainer according to one embodiment. Referring to FIG. 10, in one embodiment, DP accelerator 105 includes memory/storage 280, which includes watermark algorithm trainer 1001. Algorithm trainer 1001 can train a baseline watermark algorithm to generate additional or derived watermark algorithms. In one embodiment, algorithm trainer 1001 includes generation module 1003, training criteria determiner 1005, inference accuracy determiner 1007, compatibility determiner 1009, verification module 1011, and configuration module 1013. Generation module 1003 can generate new watermark algorithms using previous watermark algorithms. Training criteria determiner 1005 can determine a set of training criteria for a watermark algorithm training. Inference accuracy determiner 1007 can determine inference accuracy of an AI model with or without a watermark. Compatibility determiner 1009 can determine and assign a compatibility score to a watermark/AI model pair. For example, the compatibility for adding a dummy layer to a multi-layered deep neural network can be assigned a score of 0.3, the compatibility for altering one or more weights of the AI model by a peppercorn value (a very small value compared with the actual weighting) can be assigned a score of 0.7, compatibility of training the AI model with additional hidden input data set can be assigned a score of 1. Verification module 1011 can verify whether the AI model includes a watermark and can determine a version of the watermark. Configuration module 1013 can configure a watermark unit at runtime with a watermark algorithm so the watermark algorithm is available to the DP accelerator.

Figure 11:
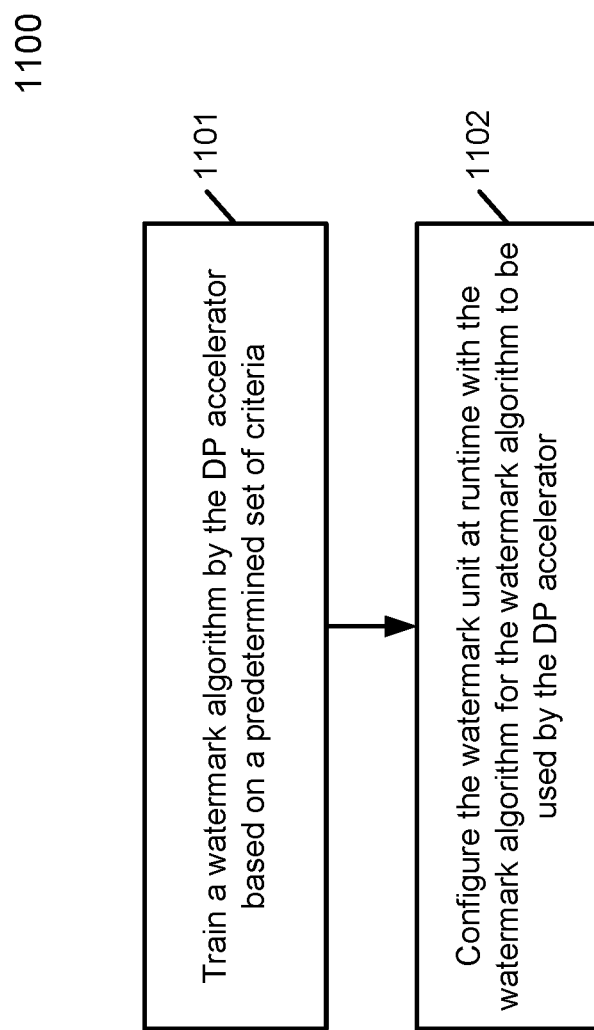
FIG. 11 is a flow diagram illustrating a method performed by a DP accelerator according to one embodiment.

FIG. 11 is a flow diagram illustrating a method performed by a DP accelerator according to one embodiment. Process 1100 may be performed by processing logic which may include software, hardware, or a combination thereof. For example, process 1100 may be performed by a DP accelerator 105 of FIG. 10. Referring to FIG. 11, at block 1101, processing logic trains a watermark algorithm by the DP accelerator based on a predetermined set of criteria, where the watermark algorithm is trained to generate variations of the watermark algorithm. The training can be a machine learning type training or regression type training to maximize some training criteria through an objective function for a baseline watermark algorithm (e.g., an initial watermark algorithm where additional algorithms can be derived). The objective function can be a weighted combination of a number of criteria, such as an inference accuracy of the AI model having the watermark, and/or a compatibility score indicator indicating compatibility of the AI model and the watermark, etc. The objective function can be optimized via an iterative optimization algorithm such as a gradient descent algorithm. The training would iteratively adjust the watermark algorithm parameters (e.g., weight values, the number of dummy layers to add, training epoch, training input data sets) along the gradient (taking steps proportional to the gradient) to maximize/minimize the objective function, or until a predetermined threshold or a number of iterations have occurred. Since there are different types, or categories of AI models (e.g., single or multilayer perceptron, deep learning neural networks, convolutional neural networks, recurrent neural network, etc.), a different watermark algorithm can be trained to generate a different AI model to maximize the inference accuracy and compatibility for the watermark/AI model pair.

At block 1102, process logic configures the watermark unit at runtime with a variation of the watermark algorithm for the watermark algorithm to be used by the DP accelerator. In one embodiment, the watermark algorithms can be versioned and assigned a global unique identifier (GUID) or any other identifier to identify the watermark algorithm. In this case, verification of the watermark for the AI model can be performed on any of the AI models so long as an identifier for the watermark algorithm is provided for the verification.

In one embodiment, the set of criteria includes a change in inference accuracy (degradation or improvement) of the artificial intelligence (AI) model having the watermark to be trained, and pairing compatibility of the watermark and the AI model.

Figure 12:
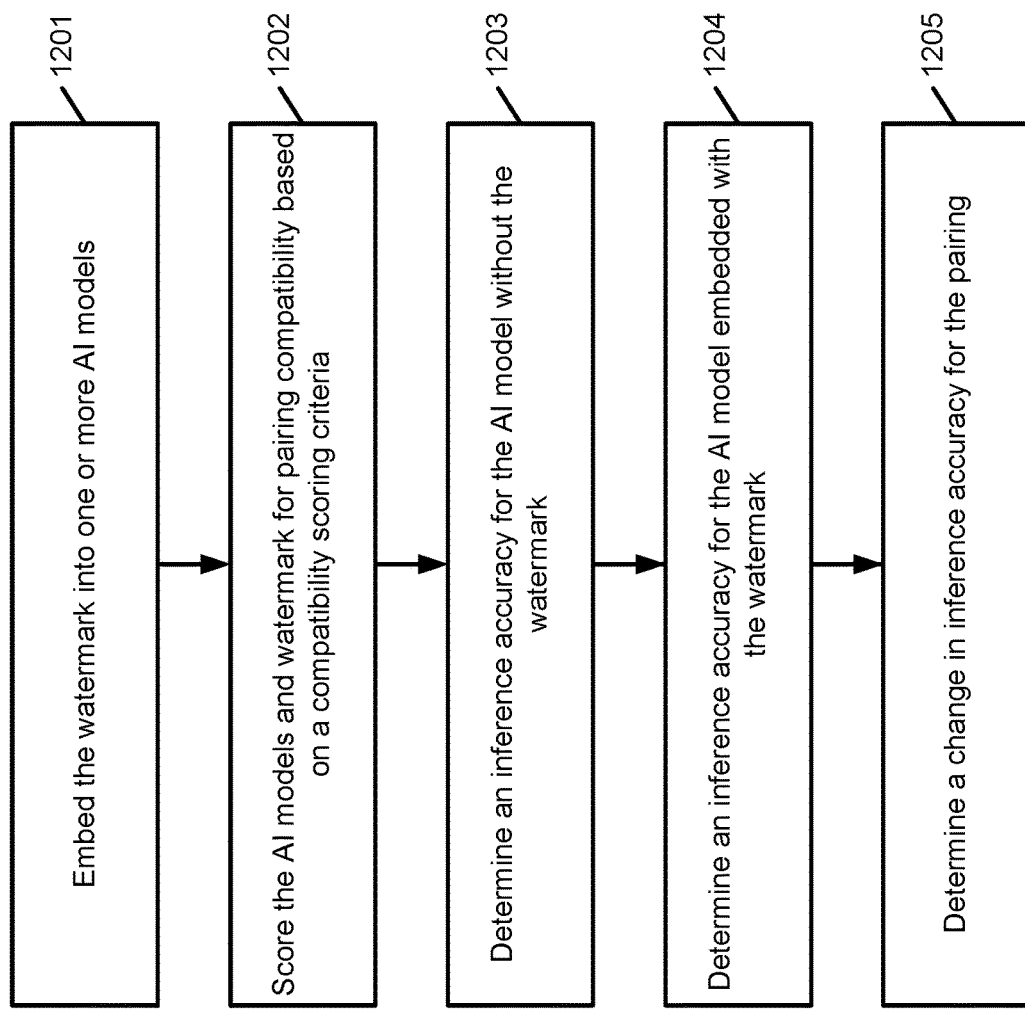
FIG. 12 is a flow diagram illustrating a method performed by a DP accelerator according to one embodiment.

FIG. 12 is a flow diagram illustrating a method performed by a DP accelerator according to one embodiment. Process 1200 may be performed by processing logic which may include software, hardware, or a combination thereof. For example, process 1200 may be performed by a DP accelerator 105 of FIG. 10. Referring to FIG. 12, at block 1201, processing logic further embeds the watermark into one or more AI models and, at block 1202, scores the AI models and watermark for pairing compatibility based on a compatibility scoring criteria. At block 1203, processing logic determines an inference accuracy for the AI model without the watermark. At block 1204, processing logic determines an inference accuracy for the AI model embedded with the watermark. At block 1205, processing logic determines a change in inference accuracy (degradation or improvement) for the pairing.

In one embodiment, the training is performed until a predetermined condition is achieved for the set of criteria or until a predetermined number of training iterations. In one embodiment, in response to a request received by a data processing (DP) accelerator, the request, sent by an application, to apply the watermark algorithm to an AI model by the DP accelerator, processing logic further applies the watermark algorithm to generate a watermark for the AI model, embeds the watermark into the AI model, and returns the AI model having the watermark to the application, wherein the watermark is used to authenticate the AI model. In one embodiment, processing logic generates the AI model by training the AI model based on a set of training data.

Figure 13:
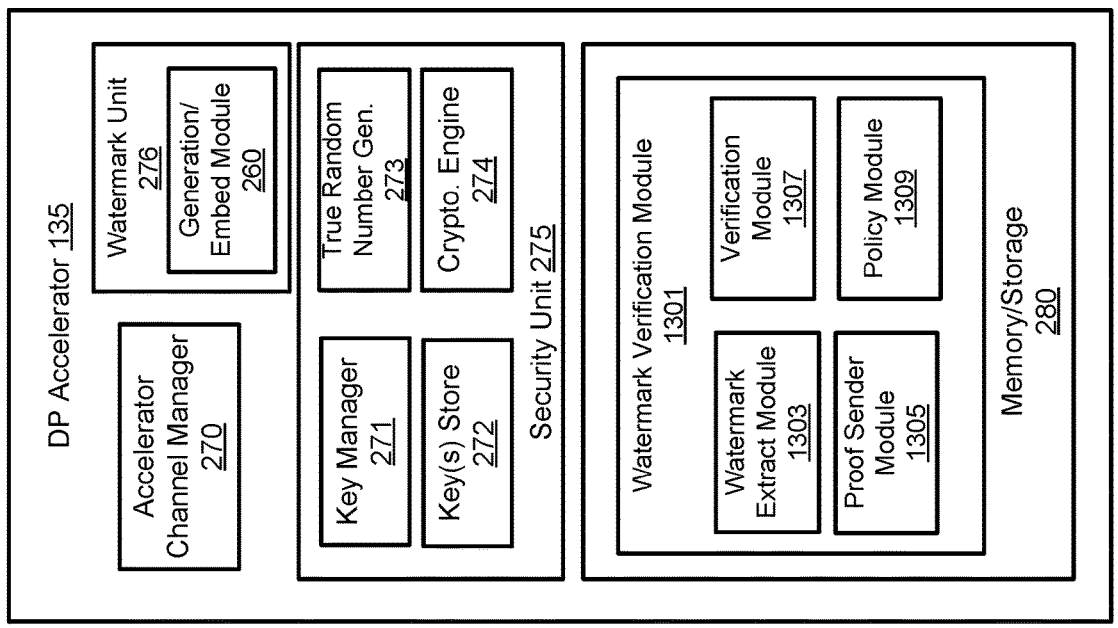
FIG. 13 is a block diagram illustrating a DP accelerator with a watermark verification module according to one embodiment.

FIG. 13 is a block diagram illustrating a DP accelerator with a watermark verification module according to one embodiment. Referring to FIG. 13, in one embodiment, DP accelerator 105 includes memory/storage 280, which includes watermark verification module 1301. Watermark verification module can verify a watermark and allow in inference if a policy applied to the AI model is satisfied. In one embodiment, watermark verification module 1301 includes watermark extract module 1303, proof sender module 1305, verification module 1307, and policy module 1309. Watermark extract module 1303 can extract the watermark form an AI model/watermark pair. Proof sender module 1305 can generate a proof the AI model contains the watermark based on the extraction. Verification module 1307 can read the watermark and determine that the watermark is from a trusted source. Policy module 1309 can apply one or more policies to the AI models.

Figure 14:
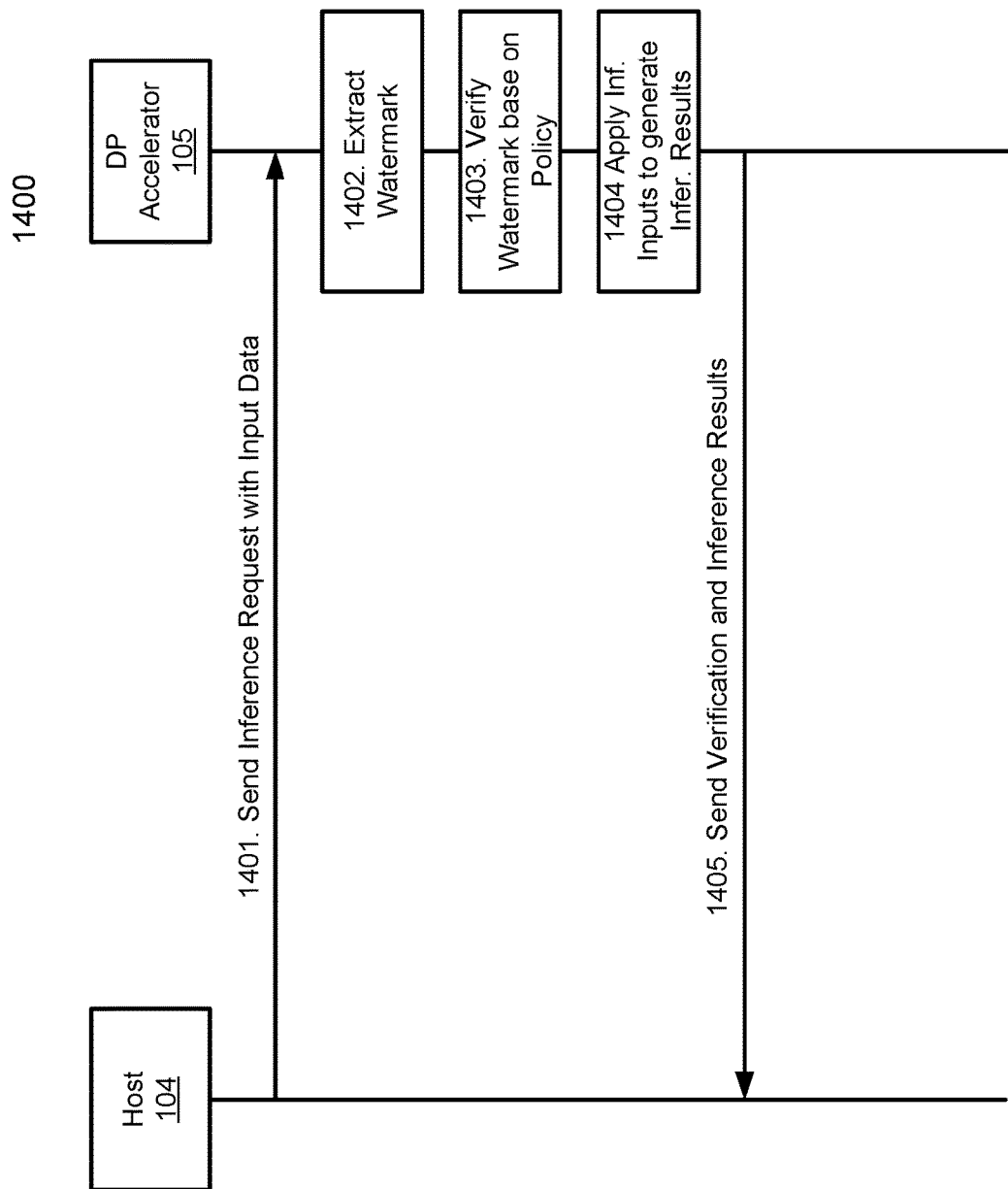
FIG. 14 is a flow chart illustrating a process to verify a watermark according to one embodiment.

FIG. 14 is a flow chart illustrating a process to verify a watermark according to one embodiment. Process 1400 may be performed by processing logic which may include software, hardware, or a combination thereof. For example, process 1400 may be performed by a DP accelerator 105 of FIG. 13. Referring to FIG. 11, at block 1401, an application of host 104 sends an inference request to DP accelerator 105. The inference request can include a set of inference input data. At block 1402, DP accelerator 105 extracts a watermark from a AI model/watermark pair based on the inference request to determine if one or more policies is satisfied for the AI model prior to inference. A policy is a protocol scheme to evaluate whether to allow the AI model/watermark to be applied a training or inference by a particular DP accelerator. An example of a policy can be: the AI model/watermark must contain a watermark generated by some baseline watermark algorithms or some versions (e.g., latest versions) of algorithm derived from the baseline watermark algorithms, the AI model/watermark must contain a particular type of watermark algorithm (e.g., type 1 or type 2), the AI model must contain a verifiable watermark from a particular source (e.g., a watermark corresponding to a particular organization, group, team, etc.), and/or if a signature for the AI model/watermark is verified to be from a trusted source, e.g., generated by DP accelerator 105, or other DP accelerators in communication with host 104. In one embodiment, one or more policies can be applied to a category of AI models or a particular individual AI model. In another embodiment, a DP accelerator can have a different set or a same set of policies than another DP accelerator of host 104.

At block 1403, DP accelerator 105 verifies the watermark based on the one or more policies. The watermark verification module 1301 of FIG. 13 may maintain a mapping table which maps the AI model and/or watermark of the AI model to one or more policies. DP accelerator 105 can then retrieve the policies based on the AI model and/or watermark for verification.

If satisfied, at block 1404, DP accelerator 105 applies the AI model/watermark pair to the inference input data to generate inference results. At block 1405, DP accelerator 105 sends verification proof and/or the inference results to the requesting application (via host 104). A verification proof can be a signature which includes an encrypted hash of the verification results, AI model/watermark, and/or the inference results, the encryption based on a private key of a security key pair of DP accelerator 105. The verification proof can then be decrypted by a public key of the security key pair by host 104 or any third-parties to verify the proof.

Figure 15:
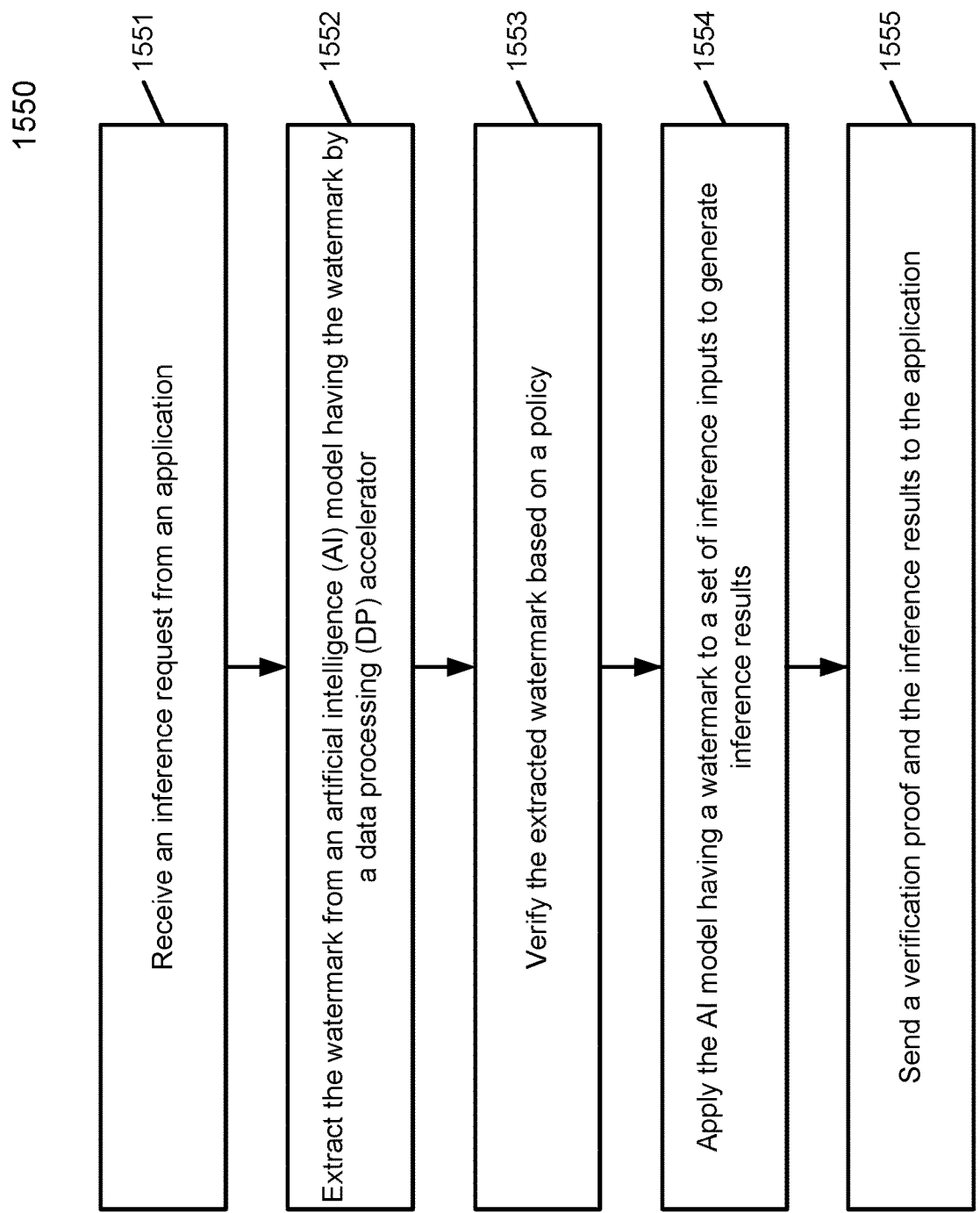
FIG. 15 is a flow diagram illustrating a method performed by a DP accelerator according to one embodiment.

FIG. 15 is a flow diagram illustrating a method performed by a DP accelerator according to one embodiment. Process 1550 may be performed by processing logic which may include software, hardware, or a combination thereof. For example, process 1550 may be performed by a DP accelerator 105 of FIG. 13. Referring to FIG. 15, at block 1551, processing logic receives an inference request from an application. At block 1552, processing logic extracts the watermark from an artificial intelligence (AI) model having the watermark by a data processing (DP) accelerator. At block 1553, processing logic verifies the extracted watermark based on a policy. At block 1554, processing logic applies the AI model having a watermark to a set of inference inputs to generate inference results. At block 1555, processing logic sends a verification proof and the inference results to the application.

In one embodiment, the inference results are generated after the extracted watermark is verified successfully based on the policy. In one embodiment, the policy includes a criterion that the AI model contain a verifiable watermark generated by a DP accelerator and the watermark includes a machine recognizable watermark for verification.

In one embodiment, the policy includes a criterion that a signature for the AI model having the watermark is successfully verified. In one embodiment, a different policy is applied to a different type of watermark algorithm. In one embodiment, a different policy is applied to a different version of a watermark algorithm. In one embodiment, the verification proof includes a signature for a result of the inference request.

Figure 16:
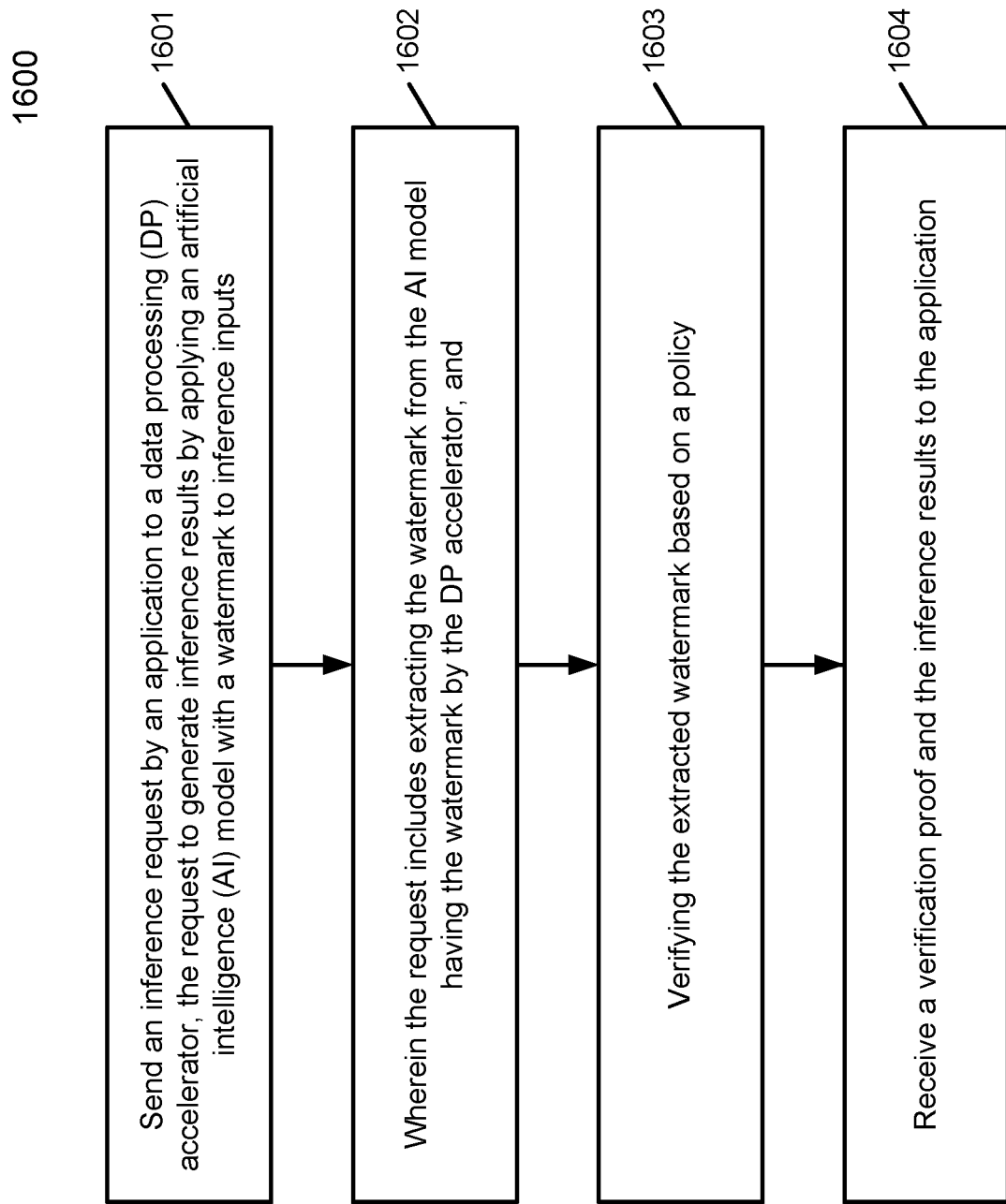
FIG. 16 is a flow diagram illustrating a method performed by an application of a host according to one embodiment.

FIG. 16 is a flow diagram illustrating a method performed by an application of a host according to one embodiment. Process 1600 may be performed by processing logic which may include software, hardware, or a combination thereof. For example, process 1600 may be performed by an application of a user, such as an application hosted on host server 104 of FIG. 3. Referring to FIG. 16, at block 1601, processing logic sends an inference request by an application to a data processing (DP) accelerator, the request to generate inference results by applying an artificial intelligence (AI) model with a watermark to inference inputs, where the request includes a request to extract the watermark from the AI model having the watermark by the DP accelerator, and verify the extracted watermark based on a policy. At block 1602, processing logic receives a verification proof and/or the inference results by the application.

In one embodiment, the inference results are generated after the extracted watermark is verified successfully based on the policy. In one embodiment, the policy includes a criterion that the AI model contain a verifiable watermark generated by a DP accelerator and the watermark includes a machine recognizable watermark for verification.

In one embodiment, the policy includes a criterion that a signature for the AI model having the watermark is successfully verified. In one embodiment, a different policy is applied to a different type of watermark algorithm. In one embodiment, a different policy is applied to a different version of a watermark algorithm. In one embodiment, the verification proof includes a signature for a result of the inference request.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 17:
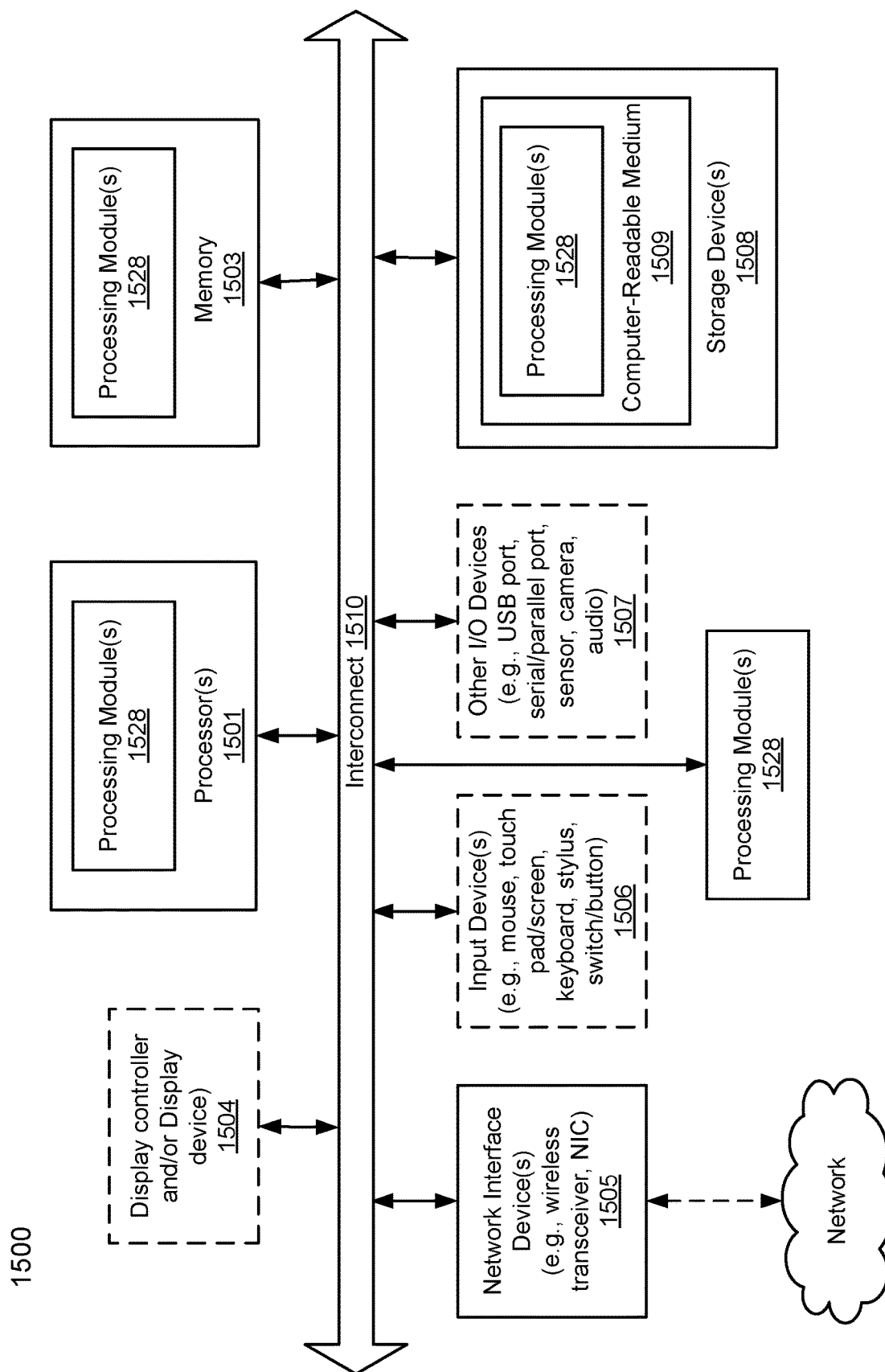
FIG. 17 is a block diagram illustrating a data processing system according to one embodiment.

FIG. 17 is a block diagram illustrating an example of a data processing system which may be used with one embodiment of the invention. For example, system 1500 may represent any of data processing systems described above performing any of the processes or methods described above, such as, for example, a client device, a host, or a DP accelerator described above, such as, for example, clients 101-102, host server 104, or DP accelerator 105 of FIG. 1, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, host server 104 of FIGS. 1-3, or DP accelerator 105 of FIGS. 1-3, 7, 10, 13, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing data by a data processing (DP) accelerator, the method comprising:
   in response to a request received by a data processing (DP) accelerator, the request, sent by an application, to apply a watermark algorithm to an artificial intelligence (AI) model by the DP accelerator, determining that the watermark algorithm is not available for application to the AI model at a watermark unit of the DP accelerator, wherein application of the watermark algorithm to the AI model generates a watermark for the AI model;
   sending a request for the watermark algorithm in response to determination the watermark algorithm is not available for application to the AI model at the watermark unit of the DP accelerator;
   receiving the watermark algorithm by the DP accelerator; and
   configuring the watermark unit at runtime with the watermark algorithm for the watermark algorithm to be used by the DP accelerator.

2. The method of claim 1, further comprising:
   embedding the watermark into the AI model based on the watermark algorithm; and
   returning the AI model having the embedded watermark back to the application, wherein the watermark is used to authenticate the AI model.

3. The method of claim 2, further comprising:
   signing the AI model with the watermark to generate a signature, wherein the signature is used to authenticate the AI with the watermark for a two-factor authentication.

4. The method of claim 1, wherein the watermark algorithm is provided by a cloud provider, or a user of the cloud provider, or the application.

5. The method of claim 1, wherein the watermark algorithm is received via a dedicated communication channel, wherein the communication channel is configured by a cloud provider.

6. The method of claim 1, further comprising generating the AI model by training the AI model based on a set of training data.

7. The method of claim 1, further comprising:
   receiving a pre-trained AI model; and
   retraining the AI model by training the AI model based on a set of training data.

8. A non-transitory machine-readable medium having instructions stored therein, which when executed by a processor, cause the processor to perform operations, the operations comprising:
   in response to a request received by a data processing (DP) accelerator, the request, sent by an application, to apply a watermark algorithm to an artificial intelligence (AI) model by the DP accelerator, determining that the watermark algorithm is not available for application to the AI model at a watermark unit of the DP accelerator, wherein application of the watermark algorithm to the AI model generates a watermark for the AI model;
   sending a request for the watermark algorithm in response to determination the watermark algorithm is not available for application to the AI model at the watermark unit of the DP accelerator;
   receiving the watermark algorithm by the DP accelerator; and
   configuring the watermark unit at runtime with the watermark algorithm for the watermark algorithm to be used by the DP accelerator.

9. The non-transitory machine-readable medium of claim 8, wherein the operations further comprise:
   embedding the watermark into the AI model based on the watermark algorithm; and
   returning the AI model having the embedded watermark back to the application, wherein the watermark is used to authenticate the AI model.

10. The non-transitory machine-readable medium of claim 9, wherein the operations further comprise:
    signing the AI model with the watermark to generate a signature, wherein the signature is used to authenticate the AI with the watermark for a two-factor authentication.

11. The non-transitory machine-readable medium of claim 8, wherein the watermark algorithm is provided by a cloud provider, or a user of the cloud provider, or the application.

12. The non-transitory machine-readable medium of claim 8, wherein the watermark algorithm is received via a dedicated communication channel, wherein the communication channel is configured by a cloud provider.

13. The non-transitory machine-readable medium of claim 8, wherein the operations further comprise generating the AI model by training the AI model based on a set of training data.

14. The non-transitory machine-readable medium of claim 8, wherein the operations further comprise:
    receiving a pre-trained AI model; and
    retraining the AI model by training the AI model based on a set of training data.

15. A data processing system, comprising:
    a processor; and
    a memory coupled to the processor to store instructions, which when executed by the processor, cause the processor to perform operations, the operations including
    in response to a request received by a data processing (DP) accelerator, the request, sent by an application, to apply a watermark algorithm to an artificial intelligence (AI) model by the DP accelerator, determining that the watermark algorithm is not available for application to the AI model at a watermark unit of the DP accelerator, wherein application of the watermark algorithm to the AI model generates a watermark for the AI model;
    sending a request for the watermark algorithm in response to determination the watermark algorithm is not available for application to the AI model at the watermark unit of the DP accelerator;
    receiving the watermark algorithm by the DP accelerator; and
    configuring the watermark unit at runtime with the watermark algorithm for the watermark algorithm to be used by the DP accelerator.

16. The system of claim 15, wherein the operations further comprise:
  embedding the watermark into the AI model based on the watermark algorithm; and
  returning the AI model having the embedded watermark back to the application, wherein the watermark is used to authenticate the AI model.

17. The system of claim 16, wherein the operations further comprise:
  signing the AI model with the watermark to generate a signature, wherein the signature is used to authenticate the AI with the watermark for a two-factor authentication.

18. The system of claim 15, wherein the watermark algorithm is provided by a cloud provider, or a user of the cloud provider, or the application.

19. The system of claim 15, wherein the watermark algorithm is received via a dedicated communication channel, wherein the communication channel is configured by a cloud provider.

20. The system of claim 15, wherein the operations further comprise generating the AI model by training the AI model based on a set of training data.

21. The system of claim 15, wherein the operations further comprise:
  receiving a pre-trained AI model; and
  retraining the AI model by training the AI model based on a set of training data.

* * * * *